US012757015B2

(12) United States Patent
Zhang et al.

(10) Patent No.: US 12,757,015 B2
(45) Date of Patent: Oct. 6, 2026

(54) ENROLLMENT OF ENROLLEE DEVICES TO A WIRELESS NETWORK

(71) Applicant: KONINKLIJKE PHILIPS N.V., Eindhoven (NL)

(72) Inventors: Fengchang Zhang, Shanghai (CN); Xin Ge, Shanghai (CN); Hai Gu, Shanghai (CN); Fulong Ma, Shanghai (CN)

(73) Assignee: Koninklijke Philips N.V., Eindhoven (NL)

( * ) Notice: Subject to any disclaimer, the term of this patent is extended or adjusted under 35 U.S.C. 154(b) by 197 days.

(21) Appl. No.: 18/023,694

(22) PCT Filed: Aug. 17, 2021

(86) PCT No.: PCT/EP2021/072772
§ 371 (c)(1),
(2) Date: Feb. 27, 2023

(87) PCT Pub. No.: WO2022/043119
PCT Pub. Date: Mar. 3, 2022

(65) Prior Publication Data

US 2023/0319559 A1 Oct. 5, 2023

(30) Foreign Application Priority Data

Aug. 31, 2020 (WO) ................ PCT/CN2020/112623
Nov. 2, 2020 (EP) .................................... 20205180

(51) Int. Cl.
*H04W 12/06* (2021.01)
*H04W 12/08* (2021.01)

(52) U.S. Cl.
CPC ........... *H04W 12/06* (2013.01); *H04W 12/08* (2013.01)

(58) Field of Classification Search
CPC .............................. H04W 12/06; H04W 12/08
See application file for complete search history.

(56) References Cited

U.S. PATENT DOCUMENTS

| | | | | |
|---|---|---|---|---|
| 2015/0229475 | A1* | 8/2015 | Benoit | H04W 12/069 713/168 |
| 2016/0088026 | A1* | 3/2016 | Mohamad Abdul | G06F 8/65 726/1 |
| 2016/0294563 | A1* | 10/2016 | Qian | H04L 63/0428 |
| 2018/0001094 | A1 | 1/2018 | Glynn et al. | |
| 2018/0109418 | A1* | 4/2018 | Cammarota | H04W 12/50 |
| 2019/0306710 | A1 | 10/2019 | Cammarota et al. | |
| 2019/0332774 | A1* | 10/2019 | Nix | H04W 12/50 |

(Continued)

FOREIGN PATENT DOCUMENTS

| | | |
|---|---|---|
| WO | 2020080850 A1 | 4/2020 |
| WO | 2020092971 A1 | 5/2020 |

OTHER PUBLICATIONS

International Search Report and Written Opinion From PCT/EP2021/072772 Mailed Nov. 16, 2021.

*Primary Examiner* — Chau Le

(57) ABSTRACT

Proposed concepts thus aim to provide schemes, solutions, concepts, designs, methods and systems pertaining to device provisioning protocol onboarding in wireless networks. In particular, the embodiment aims to reduce overall onboarding time for a plurality of enrollee devices by controlling enrollment of the enrollee devices based on the status (e.g. availability, readiness, workload, etc.) of the configurator device.

19 Claims, 3 Drawing Sheets

(56) References Cited

U.S. PATENT DOCUMENTS

| | | | | |
|---|---|---|---|---|
| 2020/0092971 | A1* | 3/2020 | Tsubota | A61N 5/0613 |
| 2020/0162557 | A1* | 5/2020 | Gattu | H04L 41/044 |
| 2020/0169461 | A1* | 5/2020 | Stationwala | H04L 41/0806 |
| 2020/0204381 | A1* | 6/2020 | Meyer | G06F 9/45558 |
| 2020/0221296 | A1* | 7/2020 | Jiang | H04L 63/0869 |

* cited by examiner

ENROLLMENT OF ENROLLEE DEVICES TO A WIRELESS NETWORK

CROSS REFERENCE TO RELATED APPLICATIONS

This application is a U.S. national phase application of International Application No. PCT/EP2021/072772 filed on Aug. 17, 2021, which claims the benefit of PCT/CN2020/0112623 filed on Aug. 31, 2020 and EP Application Serial No. 20205180.1 filed on Nov. 2, 2020 and are incorporated herein by reference.

FIELD OF THE INVENTION

The present invention is generally related to wireless communications and, more particularly, to controlling enrollment of a plurality of enrollee devices to a wireless network according to a device provisioning protocol (DPP).

BACKGROUND OF THE INVENTION

The device provisioning protocol defines device roles during provisioning (configuration) and connectivity (introduction) of device to a wireless network.

There are two types of roles, Configurator and Enrollee on the one hand and Initiator and Responder on the other.

A Configurator supports the setup of Enrollee. The Configurator and the Enrollee engage in DPP bootstrapping, DPP authentication, and the DPP configuration protocol.

Either of the Configurator or the Enrollee may perform the role of Initiator in the DPP Bootstrapping protocol and in the DPP Authentication protocol. However, only Enrollees initiate the DPP Configuration protocol and the DPP Introduction protocol.

The DPP Authentication protocol requires the Initiator to obtain the bootstrapping key of the Responder as part of a prior bootstrapping mechanism. Optionally, both devices in the DPP Authentication protocol may obtain each other's bootstrapping keys in order to provide mutual authentication. After the authentication completes, the Configurator provisions the Enrollee for device-to-device communication or infrastructure communication. As part of this provisioning, the Configurator enables the Enrollee to establish secure associations with other peers in the network.

According to a practical example, a correctly functioning process of provisioning a single enrollee could be finished in three seconds, which is typically adequate to a user. However, from the characteristic of asynchronous communications and retry policy designed in the DPP specification, there might exist abnormal enrollee device provisioning processes (e.g. due to some unknown issues), and the whole process of DPP authentication and DPP configuration could be extended to more than twenty seconds.

In practice, it is common to need to enroll more than one device into a wireless network. For instance, the number of devices to enroll into a wireless network may vary from a few to a few dozen (e.g. 3 to 36). Also, there may exist practical instances where some devices cannot be provisioned (e.g. due to unknown technical issues), or where some devices can only be enrolled after retrying multiple times.

Thus, bulk enrollment of multiple devices based on DPP can be difficult, time consuming and/or problematic, especially where there are a large number of devices to enroll. Accordingly, there is a need to improve enrollment of devices to a wireless network, particularly with respect to bulk enrollment of a large number of devices.

US 201801094 A1 discloses a DPP mechanism, according to which an intermediary device, for example a legacy mobile device, is used to facilitate booststrapping between the Entrollee and the Configurator. Such an intermediary device may obtain booststrapping data associated with an Enrollee and forward it to the Configurator, and the Configurator may provide an indicator to the intermediary device, such that the user of the intermediary device is made aware that the configuration of the Enrollee was properly completed. The inventors of this invention realize that using such an intermediary device can create an efficient way to enable bulk enrollment of a plurality of enrollees.

SUMMARY OF THE INVENTION

The invention is defined by the claims.

According to examples in accordance with an aspect of the invention, there is provided intermediary apparatus for controlling enrollment of a plurality of enrollee devices to a wireless network according to a device provisioning protocol, DPP, the intermediary apparatus comprising:

- an interface configured to obtain authentication data associated with each of the plurality of enrollee devices;
- a status component configured to determine a status of a configurator device of the Wi-Fi network; and
- a communication component configured to communicate authentication data associated with one or more of the enrollee devices to the configurator device based on the determined status of the configurator device.

Proposed concepts thus aim to provide schemes, solutions, concepts, designs, methods and systems pertaining to DPP onboarding in wireless networks. In particular, embodiments aim to reduce overall onboarding time for a plurality of enrollee devices by controlling enrollment of the enrollee devices based on the status (e.g. availability, readiness, workload, etc.) of the configurator device. For example, embodiments may check the status of the configurator device, and may queue up new device enrollment/provisioning tasks if the configurator device is busy or unavailable. If the configurator device is available for new device provisioning, an embodiment may release a new device enrollment/provisioning task from the queue and send the authentication data to the configurator device to start a new device enrollment/provisioning process.

Modifying the device provisioning protocol to support the use of intermediary apparatus which controls the delivery of authentication data to the configurator device may enable simple and/or efficient bulk enrollment of multiple devices into a wireless network. The use of intermediary apparatus to assist device enrollment may reduce complexity and ensure that enrollment requests are only delivered to the configurator device at an appropriate time. Embodiments may thus reduce a number of failed enrollment attempts that may otherwise be caused by the configurator device being unavailable or occupied.

Additionally, proposed concepts may support multiple intermediary devices, and thus improve scalability of a deployment. In some implementations, intermediary apparatus may be coupled using a remote network while still assisting with the provisioning of devices for a network managed by the configurator device.

According to some embodiments, there is proposed a concept of multiple enrollee devices sending their authentication data (e.g. bootstrapping data) to an intermediary apparatus (e.g. an intermediary controller). The authentication data from the different enrollee devices may then be held (e.g. queued) at the intermediary apparatus while the intermediary apparatus determines the status of the configurator device of the wireless network. The intermediary apparatus then only sends selected authentication data (e.g. data at the front of the queue) to the configurator device when the status of the configurator device is such that the configurator is available and/or ready to receive and process authentication data. In this way, time delays resulting from failed attempts to enrollment attempts may be reduced or minimized, thus reducing a time required to onboard multiple enrollee devices to the wireless network.

In some embodiments, the status component may comprise a monitoring component adapted to monitor an operating status of the configurator device to determine when the configurator device is in an available state during which the configurator device is available to enroll an enrollee device to the wireless network. The communication component may then be configured to, responsive to monitoring component determining that the configurator device is in an available state, communicate authentication data associated with one or more of the enrollee devices to the configurator device.

Further, the communication component may be configured to, responsive to monitoring component determining that the configurator device is not in an available state, prevent communication of authentication data associated with one or more of the enrollee devices to the configurator device.

In some embodiments, the interface component may be configured to intercept authentication data communicated from an enrollee device to the configurator device of the wireless network.

The interface component may configured to receive authentication data from a mobile computing device (such as a smart phone or table computer for example). For instance, the mobile computing device may be configured to obtain authentication data from a user (e.g. via a user input interface) or from an enrollee device (e.g. via a short-range communication link or by capturing an image of a Quick Response® (QR) code).

Some embodiments may further comprise a queuing component configured to store the obtained authentication data in an ordered queue. The communication component may then be configured to communicate authentication data from the ordered queue based on its ordering in the queue.

Further, the queuing component may be configured to position first authentication data associated with a first enrollee device in the ordered queue based on a property of the first enrollee device or a time value associated with the first authentication data. Thus, there may be proposed a concept of controlling a priority of enrollment tasks in the ordered queue. A rule of prioritizing the authentication data in the queue could be defined according to one or more factors, such as, device type, device group, failure times, etc. A default rule could be established based on one or more of these (or other) factors. Alternatively, or additionally, a user could adjust the priorities manually. Further, embodiments may be adapted to suspend, resume and cancel some enrollment tasks on-demand. A special case may also be provided for dealing with device provision failure times. For instance, in general, the higher the number of enrollment failures (i.e. instances of failure to be onboarded/provisioned to the network), the lower the priority. A threshold value may be configured, beyond which a device enrollment task could suspended or cancelled. In this way, those tasks may be skipped in subsequent device enrollment processes.

The authentication data associated with an enrollee device may comprise bootstrapping information. This may facilitate control of a bootstrapping procedure, wherein an out-of-band technique is used (which typically involves proximity or physical association with the enrollee device). For example, bootstrapping may include scanning a Quick Response® (QR) code that encodes a public bootstrap key. By providing support for this form of authentication, proposed embodiments may still allow certain devices (such as Internet-of-Things (IoT) devices, wearable accessories, home automation devices, etc.) that lack a user interface to be authenticated and enrolled via a configurator device.

In some embodiments, the intermediary apparatus may comprise a legacy device that does not natively support the device provisioning protocol, and the communication component may be configured to communicate authentication data via an application layer at the intermediary apparatus. Such embodiments may thus support the use of a legacy device as (all or part of) the intermediary apparatus, thereby encouraging adoption of the DPP. For example, because intermediary apparatus may comprise a legacy device while still facilitating control of the enrollment of a plurality of enrollee devices, the DPP can be readily adopted by users having legacy devices.

According to other examples in accordance with an aspect of the invention, there is provided a method for controlling enrollment of a plurality of enrollee devices to a wireless network according to a device provisioning protocol, DPP, the method comprising:

- obtaining, at an intermediary apparatus, authentication data associated with each of the plurality of enrollee devices;
- determining a status of a configurator device of the wireless network; and
- communicating authentication data associated with one or more of the enrollee devices to the configurator device based on the determined status of the configurator device.

According to another aspect, there is provided a computer program product, wherein the computer program product comprises a computer-readable storage medium having computer-readable program code embodied therewith, the computer-readable program code configured to perform all of the steps of a proposed embodiment.

Thus, there may also be provided a computer system comprising: a computer program product according to proposed embodiment; and one or more processors adapted to perform a method according to a proposed concept by execution of the computer-readable program code of said computer program product.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
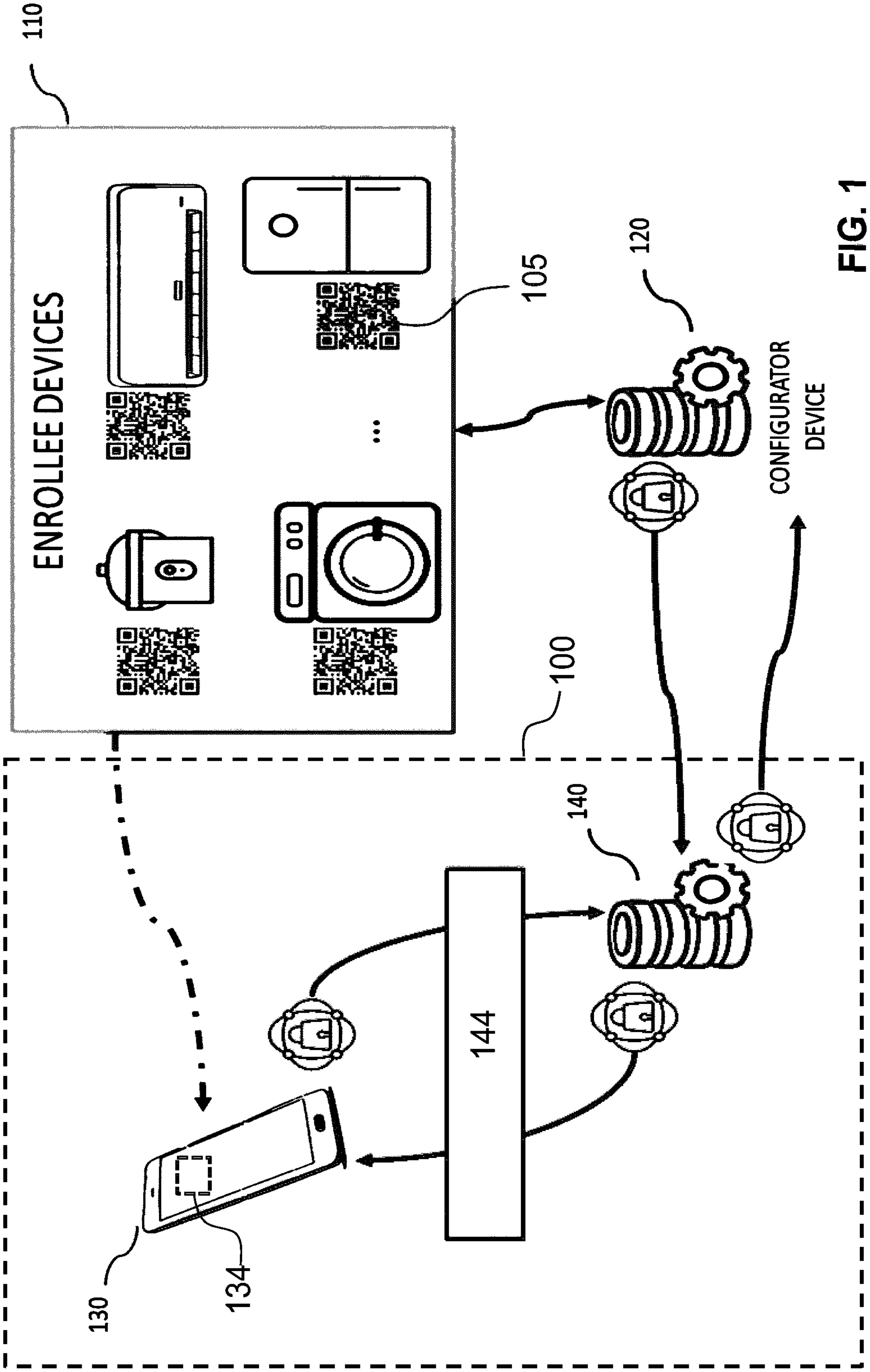
FIG. 1 a simplified diagram of an exemplary embodiment of intermediary apparatus for controlling enrollment of a plurality of enrollee devices to a wireless network according to a DPP.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. The mere fact that certain measures are recited in mutually different dependent claims does not indicate that a combination of these measures cannot be used to advantage.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

It should be understood that the Figures are merely schematic and are not drawn to scale. It should also be understood that the same reference numerals are used throughout the Figures to indicate the same or similar parts.

Implementations in accordance with the present disclosure relate to various techniques, methods, schemes and/or solutions pertaining to controlling enrollment of a plurality of enrollee devices for DPP onboarding in wireless networks. According to proposed concepts, a number of possible solutions may be implemented separately or jointly. That is, although these possible solutions may be described below separately, two or more of these possible solutions may be implemented in one combination or another.

The term "DPP-based Wi-Fi network" refers to a network formed by multiple Wi-Fi device such that at least one of the Wi-Fi repeaters is capable of acting or otherwise functioning as a DPP configurator.

Reference to a "smart" refers to a device that is capable of reading QR code information present on a Wi-Fi repeater as well as connecting to a wireless access point (AP). Example of smart devices may include smartphones (or 'mobile phones'), smartwatches, tablet computers, and portable computing devices (such as personal digital assistants).

The terms "configured device" or "enrolled device" refer to a device that is onboarded/enrolled in a wireless network (e.g., DPP-based Wi-Fi repeater network or MAP-R2 network) using a DPP mechanism. A configured (or enrolled) device is capable of acting or otherwise functioning as a DPP initiator.

The terms "unconfigured device" and "enrollee device" refer to a device that is not yet onboarded/enrolled into the wireless network. Thus, a new device that is not yet configured for a network may be referred to as an enrollee device.

A DPP may be used to facilitate configuration of an enrollee device being introduced to the network. For example, the DPP may provide authentication and authenticated key establishment between the enrollee device and a configurator device. A configurator device provides the configuration used by the enrollee device to join the network. Each of the enrollee device and the configurator device may have associated authentication data (e.g. a public bootstrap key (also sometimes referred to as a "public identity key")) which is trusted between the devices and which can be used for an initial authentication. In some implementations, the authentication data is used for generating a temporary provisioning key.

When a public bootstrap key of another device is obtained using an out-of-band technique, the process of obtaining the public bootstrap key is referred to as "bootstrapping." Bootstrapping provides trust in the public bootstrap key because the out-of-band technique typically involves proximity or physical association with the enrollee device. For example, bootstrapping may include scanning a Quick Response® (QR) code that encodes the public bootstrap key. Support for this form of authentication may allow certain devices (such as IOT devices, wearable accessories, home automation devices, etc.) that lack a user interface to be authenticated with a configurator device.

According to the proposed concept(s), a DPP may be enhanced to utilize intermediary apparatus. The intermediary apparatus may serve as an intermediary between an enrollee device and the configurator device. For example, the intermediary apparatus may facilitate and control "bootstrapping" between the enrollee device and the configurator device. The intermediary apparatus may obtain enrollee authentication data (such as a public bootstrap key) associated with the enrollee device and control provision of the enrollee authentication data to the configurator device according to a status of the configurator device.

For instance, the intermediary apparatus may receive authentication data associated with enrollee devices from a user's smartphone or tablet, and then stored the received authentication data in an ordered queue. The intermediary apparatus may then only send the authentication to the configurator device only when it is at the front of the ordered queue and the status of the configurator device is such that the configurator device is available and ready to use the authentication data.

The authentication data associated with an enrollee device may be communicated to the configurator device in an enrollment request on behalf of the enrollee device. Further, according to some embodiments, the intermediary apparatus may sign the enrollment request using a configurator private signing key obtained from the configurator device. In this way, the configurator device can verify the authenticity of the enrollment request using a configurator public verification key that corresponds to the configurator private signing key.

In some implementations, the intermediary apparatus may comprise a legacy device. A legacy device refers to any device which is does not natively support the DPP or which is not capable of utilizing the DPP for its own network configuration. However, the legacy device may be capable of executing a client application which can communicate with a host service of the configurator device. Therefore, even though the legacy device does not implement the DPP, the client application running on the legacy device can still be used to facilitate the control of enrollment of enrollee devices.

Purely by way of example, a proposed embodiment may provide a method to enable bulk enrollment of multiple devices based on DPP by using intermediary apparatus, such as an intermediary smart phone. The method may comprise the following main steps at the intermediary apparatus:

(a) Receiving authentication data (e.g. bootstrapping key) from an enrollee device and queuing up an associated enrollment task. That is, the intermediary apparatus accepts the device enrollment task by receiving the enrollee's authentication data, and then places it into a task queue.

(b) Checking status of the configurator device. The intermediary apparatus checks the state of the configurator device by querying it and/or receiving a notification sent by the configurator device.

(c) Sending authentication data to the configurator device based on the status of the configurator device. For instance, if the configurator device is in a "Finished" or "Terminated" state, the intermediary apparatus picks up a task (if exists) from the task queue according to a predefined queueing policy and sends the authentication data of the task to the configurator device.

(d) Sleeping/Waiting if the configurator device is in state other than "Finished" or "Terminated". For example, the intermediary apparatus enters a sleep (e.g. low power) mode, if there is no device enrollment task in the queue.

(e) Waking up in response to detecting any predefined events when in a sleeping mode. For example, according to an event handling policy, the intermediary apparatus may wake up and check the task queue status. If there are pending device enrollment tasks (i.e. the task queue is not empty), then the intermediary apparatus restarts the whole process from step (b)—for example, a new device enrollment task happens, a sleep mode expires, or a configurator device notifies the intermediary apparatus of a state change, etc.

An alternative proposed embodiment the intermediary apparatus may not include an intermediary smart phone, but may instead be implemented as dedicated apparatus (e.g. a portable enrollment device) that is configured to obtain authentication data directly form a plurality of enrollee devices (i.e. not via an intermediary smartphone/tablet-computer). For example, the interface of the intermediary apparats may comprise a short-range communication interface that is adapted to establish a communication link with an enrollee device and receive authentication data from the enrollee device via the established communication link). Further, in some examples, the intermediary apparatus may be integrated into a router (i.e. a network router may comprise intermediary apparatus according to a proposed embodiment).

From the above, it will be understood that proposed embodiments may employ a concept of monitoring the status of the configurator device. In general, there are active and passive modes for checking the status of the configurator device. The proposed intermediary apparatus may actively query the status of the configurator device, given that the configurator device provides a status query/check interface. Alternatively, or additionally, the configurator device could broadcast its status change (e.g. via broadcast notifications), for which the intermediary apparatus could passively listen.

Referring now to FIG. 1, there is depicted a simplified diagram of an exemplary embodiment of intermediary apparatus 100 for controlling enrollment of a plurality of enrollee devices to a wireless network according to a DPP.

The intermediary apparatus 100 is configured to enable bulk enrollment of enrollee devices 110 based on DPP. Specifically, in this example, the intermediary apparatus comprises an interface 134, a status component 140, and a communication component 144.

The interface 134 is configured to obtain authentication data associated with each of the plurality of enrollee devices 110. More specifically, the interface 134 is provided by a legacy device 130, namely a portable computing device 130 (e.g. smartphone or tablet computer), and is configured to capture authentication data via an out-of-band method. For instance, a camera of the smartphone 130 is configured to act an interface 134 be being controlled to capture a respective QR code 105 of an enrollee device 110. Such a QR code 105 of an enrollee device comprises bootstrapping information (e.g. a boot strapping key) in a machine-readable format.

The status component 140 is configured to determine a status of a configurator device 120 of the wireless network. In this example, status component comprises a monitoring component (not visible in FIG. 1) that monitors an operating status of the configurator device 120, so as to determine when the configurator device 120 is in an available state (i.e. a state during which the configurator device 120 is available to enroll an enrollee device 110 to the wireless network).

The communication component 144 is configured to communicate authentication data associated with one or more of the enrollee devices 110 to the configurator device 120 based on the determined status of the configurator device 120. More specifically, responsive to monitoring component 140 determining that the configurator device 120 is in an available state, the communication component 144 communicates authentication data associated with one or more of the enrollee devices 110 to the configurator device 120. Conversely, responsive to the monitoring component 140 determining that the configurator device 120 is not in an available state, the communication component 144 prevents communication of authentication data associated with one or more of the enrollee devices 110 to the configurator device 120.

To control what authentication data is communicated, exemplary embodiments of the intermediary apparatus 100 may include a queuing component (not shown) that is configured to store the obtained authentication data in an ordered queue. By way of example, the queueing component may position first authentication data associated with a first enrollee device in the ordered queue based on one or more factors, such as device type, device group, failure times, etc. That is, a queueing rule may be established based on one or more of these (or other) factors. Alternatively, or additionally, a user could adjust the queueing priorities manually.

The communication component 144 may then communicate authentication data from the ordered queue based on its ordering in the queue.

Such an approach introduces a device enrollment task queue managed by intermediary apparatus 100.

Using a proposed embodiment (such as that of FIG. 1), a user can perform a bulk enrollment of multiple devices 110 by simply providing bootstrapping data to the intermediary apparatus 100 without waiting. The intermediary apparatus 100 will then be responsible for accepting device bootstrapping data (e.g. via the smart phone 130 interface 134) in bulk and then coordinating the configurator device 120 to perform device provisioning tasks. In other words, a user can simply feed multiple bootstrapping data as quick as possible to the intermediary apparatus 100 without waiting.

The user may still be provided with the opportunity to query the status of the bulk enrollment of multiple devices at any time later on.

It will also be appreciated that the proposed embodiments may enable the intermediary apparatus 100 to capture authentication data of the enrollee devices 110 through any of the out-of-band methods specified in the DPP specification, e.g. QR-Code, NFC, and Bluetooth etc.

Some embodiments may require the development of communication protocols, along with accompanying software and/or hardware enabling the communication protocols: (a) A first set of communication protocols specifying the communications between the a device and the intermediary apparatus, which includes (but is not limited to) sending authentication data in bulk or single mode, and querying the status of bulk enrollment of multiple devices; (b) a second set of protocols regulating communication between the intermediary apparatus and the configurator device, which includes (but is not limited to) sending the authentication data, querying or notifying the state of the configurator device.

Figure 2:
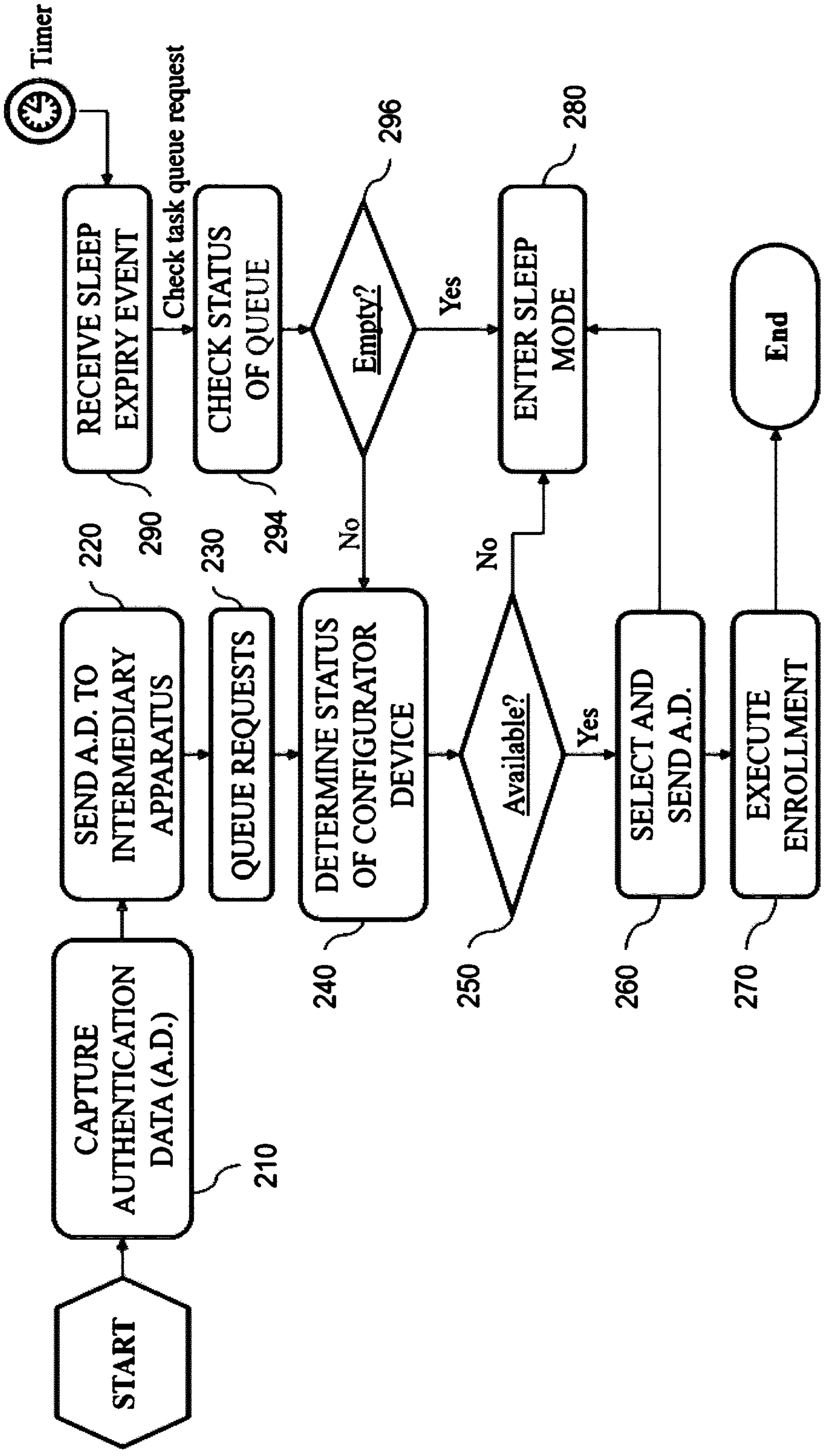
FIG. 2 is a flow diagram of a method for controlling enrollment of a plurality of enrollee devices to a wireless network according to a DPP.

By way of further example, a flow diagram of a method for controlling enrollment of a plurality of enrollee devices to a wireless network according to a DPP is depicted in FIG. 2.

Referring to FIG. 2, the method begins with the step 210 of a smartphone being used to capture bulk authentication data associated with a plurality of enrollee devices.

The captured authentication data is then provided, in step 220, from the smartphone to intermediary apparatus according to a proposed embodiment.

In step 230, the obtained authentication data is stored in an ordered queue according to a predetermined queueing policy.

Next, in step 240, the status of a configurator device of the wireless network is determined. This may done, for example, by sending a status query to the configurator device and/or listening for a status signal communicated by the configurator device.

Based on the determined status of the configurator device (obtained in step 240), it is determined in step 250, whether or not the configurator device is an available state (i.e. a state within which the configurator device is available to enroll an enrollee device to the wireless network). Responsive to determining that the configurator device is in an available state, the method proceeds to step 260, wherein authentication data associated with one or more of the enrollee device is selected (based on the queue) and communicated to the configurator device. The authentication data communicated to the configurator device in step 260 is then used by the configurator device in step 270 to execute enrollee device enrollment.

Responsive to determining that the configurator device is in an available state, the method proceeds from step 250 to step 280 wherein communication of authentication to the configurator device is prevented by the intermediary apparatus and the intermediary apparatus enters a sleep mode.

To return from (i.e. leave) a sleep mode, the method comprises step 290 of receiving a sleep expiry event (e.g. after a predetermined amount of time has elapsed and/or a predetermined event occurrence). Responsive to receiving a sleep expiry event in step 290, the method proceeds to step 294, wherein the status of the queue is determined. Based on the determined status of the queue (from step 294), it is determined, in step 296, whether or not the queue is empty.

Responsive to determining that the queue is empty, the method returns to 280, wherein the intermediary apparatus (re)enters the sleep mode. Responsive to determining that the queue is not empty, the method returns to step 240 once again.

In preceding exemplary method, it may be preferable to configure the communications to secured using appropriate communication security technologies. The implementation of an appropriate secured communication may depends on the deployment relationships between the communication pair, and could be any appropriate technologies. For example, if the intermediary apparatus and the configurator device are built in modules of an AP, any communication between the two without leaking data to the outside of the AP can be considered an appropriate secured communication mechanism, while a remote deployment typically requires more security control than a local deployment.

The communications among the various components could use local communication technologies, remote communication technologies or any of the combination of local and remote communication technologies. The local communication technologies includes but are not limited to Inter-Process Communication (IPC), Share Memory and Sharing Data files etc. The remote communication technologies includes but are not limited to TCP/IP, HTTP/HTTPS, SMTP, FTP/FTPS etc. Any of the remote communication network could be communicatively coupled to communication network through one or more gateway devices.

It will therefore be appreciated that there are many different ways of implementing the invention. For instance, an AP could be upgraded by incorporating the proposed intermediary apparatus. Also, IoT platform operators could implement a cloud based intermediary apparatus according to a proposed embodiment. Yet further, a smart phone may be configured to include or implement part or all of the proposed intermediary apparatus.

Figure 3:
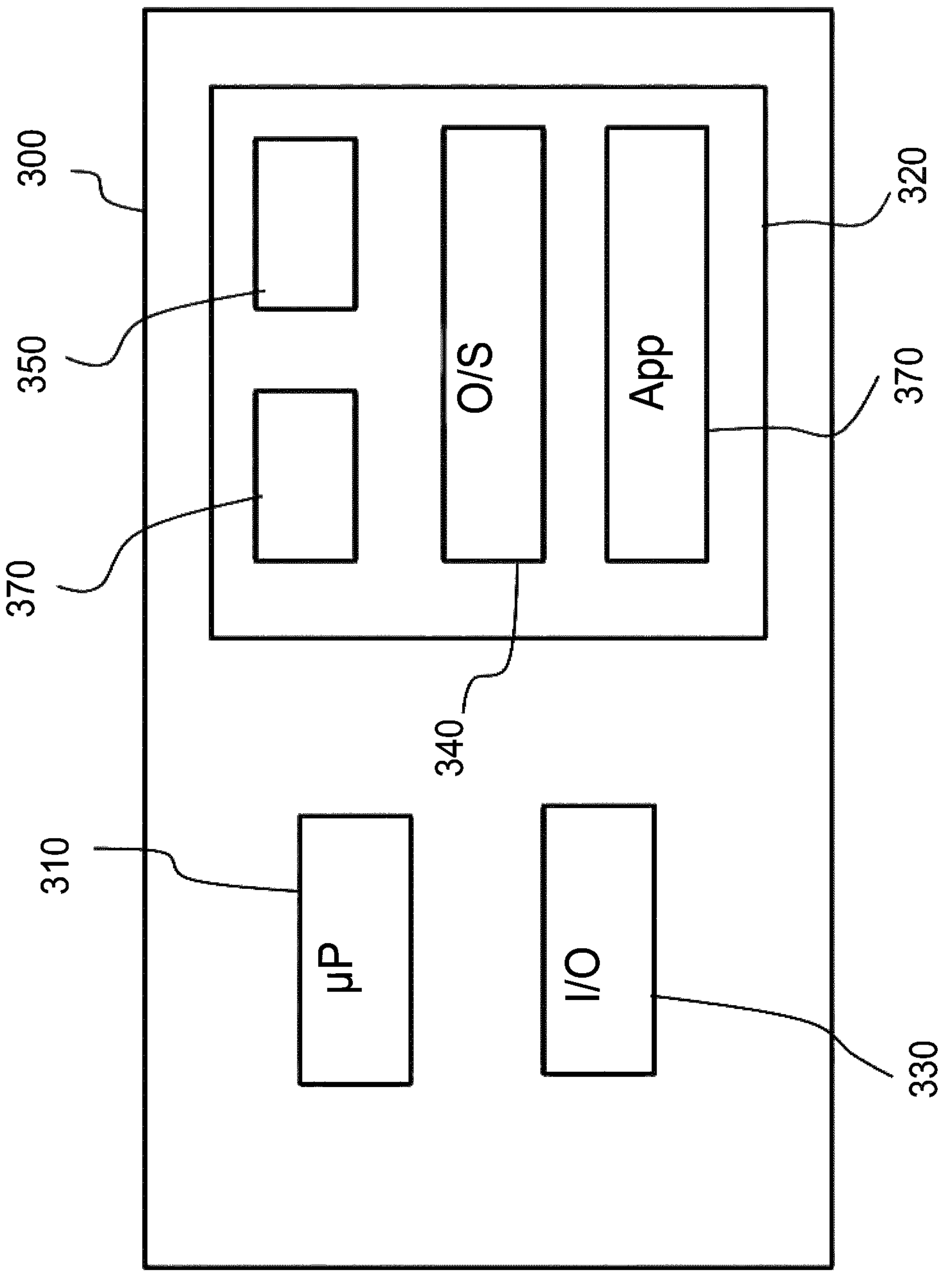
FIG. 3 is a simplified block diagram of a computer within which one or more parts of an embodiment may be employed.

By way of further example, FIG. 3 illustrates an example of a computer 300 within which one or more parts of an embodiment may be employed. Various operations discussed above may utilize the capabilities of the computer 300. For example, one or more parts of a system for controlling enrollment of a plurality of enrollee devices to a wireless network according to DPP may be incorporated in any element, module, application, and/or component discussed herein. In this regard, it is to be understood that system functional blocks can run on a single computer or may be distributed over several computers and locations (e.g. connected via internet).

The computer 300 includes, but is not limited to, PCs, workstations, laptops, PDAs, palm devices, servers, storages, and the like. Generally, in terms of hardware architecture, the computer 300 may include one or more processors 310, memory 320, and one or more I/O devices 370 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 310 is a hardware device for executing software that can be stored in the memory 320. The processor 310 can be virtually any custom made or commercially available processor, a central processing unit (CPU), a digital signal processor (DSP), or an auxiliary processor among several processors associated with the computer 300, and the processor 310 may be a semiconductor based microprocessor (in the form of a microchip) or a microprocessor.

The memory 320 can include any one or combination of volatile memory elements (e.g., random access memory (RAM), such as dynamic random access memory (DRAM), static random access memory (SRAM), etc.) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 320 may incorporate electronic, magnetic, optical, and/or other types of storage media. Note that the memory 320 can have a distributed architecture, where various components are situated remote from one another, but can be accessed by the processor 310.

The software in the memory 320 may include one or more separate programs, each of which comprises an ordered listing of executable instructions for implementing logical functions. The software in the memory 320 includes a suitable operating system (O/S) 350, compiler 340, source code 330, and one or more applications 360 in accordance with exemplary embodiments. As illustrated, the application 360 comprises numerous functional components for implementing the features and operations of the exemplary embodiments. The application 360 of the computer 300 may represent various applications, computational units, logic, functional units, processes, operations, virtual entities, and/or modules in accordance with exemplary embodiments, but the application 360 is not meant to be a limitation.

The operating system 350 controls the execution of other computer programs, and provides scheduling, input-output control, file and data management, memory management, and communication control and related services. It is contemplated by the inventors that the application 360 for implementing exemplary embodiments may be applicable on all commercially available operating systems.

Application 360 may be a source program, executable program (object code), script, or any other entity comprising a set of instructions to be performed. When a source program, then the program is usually translated via a compiler (such as the compiler 340), assembler, interpreter, or the like, which may or may not be included within the memory 320, so as to operate properly in connection with the O/S 350. Furthermore, the application 360 can be written as an object oriented programming language, which has classes of data and methods, or a procedure programming language, which has routines, subroutines, and/or functions, for example but not limited to, C, C++, C #, Pascal, BASIC, API calls, HTML, XHTML, XML, ASP scripts, JavaScript, FORTRAN, COBOL, Perl, Java, ADA, .NET, and the like.

The I/O devices 370 may include input devices such as, for example but not limited to, a mouse, keyboard, scanner, microphone, camera, etc. Furthermore, the I/O devices 370 may also include output devices, for example but not limited to a printer, display, etc. Finally, the I/O devices 370 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 370 also include components for communicating over various networks, such as the Internet or intranet.

If the computer 300 is a PC, workstation, intelligent device or the like, the software in the memory 320 may further include a basic input output system (BIOS) (omitted for simplicity). The BIOS is a set of essential software routines that initialize and test hardware at startup, start the O/S 350, and support the transfer of data among the hardware devices. The BIOS is stored in some type of read-only-memory, such as ROM, PROM, EPROM, EEPROM or the like, so that the BIOS can be executed when the computer 300 is activated.

When the computer 300 is in operation, the processor 310 is configured to execute software stored within the memory 320, to communicate data to and from the memory 320, and to generally control operations of the computer 300 pursuant to the software. The application 360 and the O/S 350 are read, in whole or in part, by the processor 310, perhaps buffered within the processor 310, and then executed.

When the application 360 is implemented in software it should be noted that the application 360 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 360 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

A single processor or other unit may fulfill the functions of several items recited in the claims.

It will be understood that the disclosed methods are computer-implemented methods. As such, there is also proposed a concept of a computer program comprising code means for implementing any described method when said program is run on a processing system.

The skilled person would be readily capable of developing a processor for carrying out any herein described method. Thus, each step of a flow chart may represent a different action performed by a processor, and may be performed by a respective module of the processing processor.

As discussed above, the system makes use of a processor to perform the data processing. The processor can be implemented in numerous ways, with software and/or hardware, to perform the various functions required. The processor typically employs one or more microprocessors that may be programmed using software (e.g. microcode) to perform the required functions. The processor may be implemented as a combination of dedicated hardware to perform some functions and one or more programmed microprocessors and associated circuitry to perform other functions.

Examples of circuitry that may be employed in various embodiments of the present disclosure include, but are not limited to, conventional microprocessors, application specific integrated circuits (ASICs), and field-programmable gate arrays (FPGAs).

In various implementations, the processor may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. If the term "adapted to" is used in the claims or description, it is noted that the term "adapted to" is intended to be equivalent to the term "configured to". Any reference signs in the claims should not be construed as limiting the scope.

The invention claimed is:

1. Intermediary apparatus for controlling enrollment of a plurality of enrollee devices to a wireless network according to a device provisioning protocol, DPP, the intermediary apparatus comprising:

- one or more computer processors;
- one or more computer readable storage mediums;
- an interface component configured to obtain authentication data associated with each of the plurality of enrollee devices;
- a status component configured to determine a status of a configurator device of the wireless network;
- a queueing component configured to create an ordered queue, wherein the ordered queue includes a priority of enrollment tasks; and
- a communication component configured to communicate authentication data associated with one or more of the enrollee devices to the configurator device based on the determined status of the configurator device, wherein the status of the configurator relates to whether the configurator device is in an available state during which the configurator device is available to enroll an enrollee device to the wireless network.

2. The apparatus of claim 1, wherein the status component comprises a monitoring component adapted to monitor an operating status of the configurator device to determine when the configurator device is in an available state during which the configurator device is available to enroll an enrollee device to the wireless network, and wherein the communication component is configured to, responsive to the monitoring component determining that the configurator device is in an available state, communicate authentication data associated with one or more of the enrollee devices to the configurator device.

3. The apparatus of claim 2, wherein the communication component is configured to, responsive to the monitoring component determining that the configurator device is not in an available state, prevent communication of authentication data associated with one or more of the enrollee devices to the configurator device.

4. The apparatus of claim 1, wherein the interface component is configured to intercept authentication data communicated from an enrollee device to the configurator device of the wireless network.

5. The apparatus of claim 1, wherein the interface component is configured to receive authentication data from a mobile computing device, the intermediary device being configured to obtain authentication data from a user or an enrollee device.

6. The apparatus of claim 1, wherein the queuing component is configured to store the obtained authentication data in the ordered queue, and wherein the communication component is configured to communicate authentication data from the ordered queue based on a position in the ordered queue.

7. The apparatus of claim 1, wherein the queuing component is configured to position first authentication data associated with a first enrollee device in the ordered queue based on a property of the first enrollee device or a time value associated with the first authentication data.

8. The apparatus of claim 1, wherein the authentication data associated with an enrollee device comprises bootstrapping information.

9. The apparatus of claim 1, wherein the intermediary apparatus comprises a legacy device that does not natively support the device provisioning protocol, and wherein the communication component is configured to communicate authentication data via an application layer at the intermediary apparatus.

10. A method for controlling enrollment of a plurality of enrollee devices to a wireless network according to a device provisioning protocol, DPP, the method comprising:

- obtaining, at an intermediary apparatus, authentication data associated with each of the plurality of enrollee devices;
- determining a status of a configurator device of the wireless network;
- creating an ordered queue, wherein the ordered queue includes a priority of enrollment tasks; and
- communicating authentication data associated with one or more of the enrollee devices to the configurator device based on the determined status of the configurator device, wherein the status of the configurator relates to whether the configurator device is in an available state during which the configurator device is available to enroll an enrollee device to the wireless network.

11. The method of claim 10, wherein determining a status of the configurator device comprises monitoring an operating status of the configurator device to determine when the configurator device is in an available state during which the configurator device is available to enroll an enrollee device to the wireless network, and wherein communicating authentication data associated with one or more of the enrollee devices comprises communicating authentication data associated with one or more of the enrollee devices to the configurator device responsive to determining that the configurator device is in an available state.

12. The method of claim 11, wherein communicating authentication data associated with one or more of the enrollee devices comprises preventing communication of authentication data associated with one or more of the enrollee devices to the configurator device responsive to monitoring component determining that the configurator device is not in an available state.

13. The method of claim 10 further comprising storing the obtained authentication data in the ordered queue, and wherein communicating authentication data associated with one or more of the enrollee devices comprise communicating authentication data from the ordered queue based on a position in the ordered queue.

14. The method of claim 10, wherein the intermediary apparatus comprises a legacy device that does not natively support the device provisioning protocol, and wherein communicating authentication data associated with one or more of the enrollee devices comprises communicating authentication data via an application layer at the intermediary apparatus.

15. The method of claim 10, wherein the authentication data associated with each of the plurality of enrollee devices is obtained by an interface component.

16. The method of claim 15, further comprising:

intercepting, by the interface component, authentication data communicated from an enrollee device to the configurator device of the wireless network.

17. The method of claim 15, further comprising:

receiving, by the interface component, authentication data from a mobile computing device, the intermediary device being configured to obtain authentication data from a user or an enrollee device.

18. The method of claim 10, further comprising:

positioning first authentication data associated with a first enrollee device in the ordered queue based on a property of the first enrollee device or a time value associated with the first authentication data.

19. The method of claim 10, wherein the authentication data associated with an enrollee device comprises bootstrapping information.

* * * * *